US012105866B2

(12) United States Patent
Geisert et al.

(10) Patent No.: US 12,105,866 B2
(45) Date of Patent: Oct. 1, 2024

(54) SPATIAL ANCHOR SHARING FOR MULTIPLE VIRTUAL REALITY SYSTEMS IN SHARED REAL-WORLD ENVIRONMENTS

(71) Applicant: META PLATFORMS TECHNOLOGIES, LLC, Menlo Park, CA (US)

(72) Inventors: David Frederick Geisert, Redwood City, CA (US); Alessia Marra, Zurich (CH); Gioacchino Noris, Zurich (CH); Panya Inversin, Gersau (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/673,682

(22) Filed: Feb. 16, 2022

(65) Prior Publication Data
US 2023/0259194 A1   Aug. 17, 2023

(51) Int. Cl.
*G06F 3/01* (2006.01)
*G02B 27/01* (2006.01)
*G06T 19/00* (2011.01)

(52) U.S. Cl.
CPC .......... *G06F 3/011* (2013.01); *G02B 27/0101* (2013.01); *G06T 19/006* (2013.01); *G02B 2027/014* (2013.01)

(58) Field of Classification Search
CPC ................ G06F 3/011; G02B 27/0101; G02B 2027/014; G06T 19/006
See application file for complete search history.

(56) References Cited

U.S. PATENT DOCUMENTS

| 9,266,019 | B2 * | 2/2016 | Kim ..................... A63F 13/825 |
| 9,384,594 | B2 * | 7/2016 | Maciocci ............. G06T 19/006 |
| 9,760,790 | B2 * | 9/2017 | Novak .................... G06F 3/011 |
| 9,939,635 | B2 * | 4/2018 | Thomas ............ G02B 27/0093 |

(Continued)

FOREIGN PATENT DOCUMENTS

CN    109671118 A    4/2019

OTHER PUBLICATIONS

International Search Report and Written Opinion for International Application No. PCT/US2023/013223, mailed May 22, 2023, 12 pages.

*Primary Examiner* — Motilewa Good-Johnson
(74) *Attorney, Agent, or Firm* — Potomac Law Group, PLLC; Dannon G. Allbee

(57) ABSTRACT

In one embodiment, a method includes capturing, by a first VR display device, one or more frames of a shared real-world environment. The VR display device identifies one or more anchor points within the shared real-world environment from the one or more frames. The first VR display device receives localization information with respect to a second VR display device in the shared real-world environment and determines a pose of the first VR display device with respect to the second VR display device based on the localization information. A first output image is rendered for one or more displays of the first VR display device. The rendered image may comprise a proximity warning with respect to the second VR display device based on determining the pose of the first VR display device with respect to the second VR display device is within a threshold distance.

19 Claims, 15 Drawing Sheets

(56) References Cited

U.S. PATENT DOCUMENTS

| | | | |
|---|---|---|---|
| 10,002,429 B2* | 6/2018 | Yoon | C05F 17/60 |
| 10,338,392 B2* | 7/2019 | Kohler | G06F 3/017 |
| 10,503,996 B2* | 12/2019 | Novak | G06T 19/006 |
| 10,617,956 B2* | 4/2020 | Black | A63F 13/212 |
| 10,627,635 B2* | 4/2020 | Kiemele | G09G 3/3611 |
| 10,685,456 B2* | 6/2020 | Lazarow | H04W 56/001 |
| 10,691,945 B2* | 6/2020 | Bostick | G06T 19/006 |
| 10,773,169 B2 | 9/2020 | Leeper et al. | |
| 10,818,089 B2 | 10/2020 | Gough et al. | |
| 10,871,934 B2* | 12/2020 | Paulovich | G06T 19/006 |
| 10,928,887 B2* | 2/2021 | Bostick | G06F 1/163 |
| 10,974,132 B2 | 4/2021 | Drake et al. | |
| 10,976,804 B1 | 4/2021 | Atlas et al. | |
| 10,997,776 B2* | 5/2021 | Emami | G02B 27/017 |
| 11,144,759 B1* | 10/2021 | Hatfield | G02B 27/0093 |
| 11,232,644 B1* | 1/2022 | Lee | G06T 19/006 |
| 11,410,360 B2* | 8/2022 | Ruth | G06F 3/011 |
| 11,410,395 B2* | 8/2022 | Velasquez | G01C 21/387 |
| 11,468,604 B2* | 10/2022 | Jagnow | H04L 67/55 |
| 11,551,430 B2* | 1/2023 | Velasquez | G06T 15/005 |
| 11,568,605 B2* | 1/2023 | Shahrokni | G06F 3/011 |
| 11,580,711 B2* | 2/2023 | Berliner | G06F 3/04842 |
| 11,995,244 B2* | 5/2024 | Bradski | G06F 3/0304 |
| 2013/0293586 A1* | 11/2013 | Kaino | G06F 3/005 |
| | | | 345/633 |
| 2015/0024368 A1* | 1/2015 | King, Jr. | G09B 5/02 |
| | | | 434/365 |
| 2016/0057726 A1* | 2/2016 | Bai | G01S 1/00 |
| | | | 340/686.6 |
| 2016/0093108 A1* | 3/2016 | Mao | G02B 27/017 |
| | | | 345/633 |
| 2016/0335808 A1* | 11/2016 | Novak | G06F 3/011 |
| 2016/0350973 A1* | 12/2016 | Shapira | G06F 3/011 |
| 2017/0262045 A1* | 9/2017 | Rouvinez | G06F 3/011 |
| 2017/0287215 A1* | 10/2017 | Lalonde | G06F 3/0481 |
| 2017/0358141 A1* | 12/2017 | Stafford | G06T 11/60 |
| 2017/0372499 A1* | 12/2017 | Lalonde | G06T 11/60 |
| 2018/0004481 A1* | 1/2018 | Fallon | G06F 3/04815 |
| 2018/0276891 A1* | 9/2018 | Craner | G08B 7/06 |
| 2018/0321894 A1* | 11/2018 | Paulovich | G06F 3/1454 |
| 2018/0374276 A1* | 12/2018 | Powers | G06T 17/205 |
| 2019/0041651 A1* | 2/2019 | Kiemele | G09G 3/3611 |
| 2019/0073829 A1* | 3/2019 | Holz | G06V 40/28 |
| 2019/0172262 A1* | 6/2019 | McHugh | G02B 27/0101 |
| 2019/0188895 A1* | 6/2019 | Miller, IV | G06T 13/40 |
| 2019/0227312 A1 | 7/2019 | Lai et al. | |
| 2019/0311544 A1* | 10/2019 | Kayo | H04L 67/131 |
| 2020/0035030 A1 | 1/2020 | Schradin et al. | |
| 2020/0103521 A1* | 4/2020 | Chiarella | H04W 4/80 |
| 2020/0167003 A1* | 5/2020 | Nonomura | G06T 3/20 |
| 2020/0225495 A1* | 7/2020 | Kiemele | G02B 27/0179 |
| 2020/0234559 A1 | 7/2020 | Chen et al. | |
| 2020/0342673 A1* | 10/2020 | Lohr | G06F 3/011 |
| 2020/0394012 A1* | 12/2020 | Wright, Jr. | G06F 3/011 |
| 2020/0394807 A1* | 12/2020 | Horesh | G05D 1/0282 |
| 2021/0081031 A1 | 3/2021 | Perlin et al. | |
| 2021/0287382 A1* | 9/2021 | Lehrich | G06F 3/1423 |
| 2021/0312887 A1* | 10/2021 | Griswold | G06F 3/0346 |
| 2022/0075591 A1* | 3/2022 | Cardenas Gasca | A63F 13/213 |
| 2023/0010105 A1* | 1/2023 | Ha | B25J 13/088 |
| 2023/0051775 A1* | 2/2023 | Hamadou | H04N 5/2628 |
| 2023/0306697 A1* | 9/2023 | Lee | G02B 27/017 |
| 2023/0326147 A1* | 10/2023 | Jouet | G06T 7/11 |
| | | | 345/419 |

\* cited by examiner

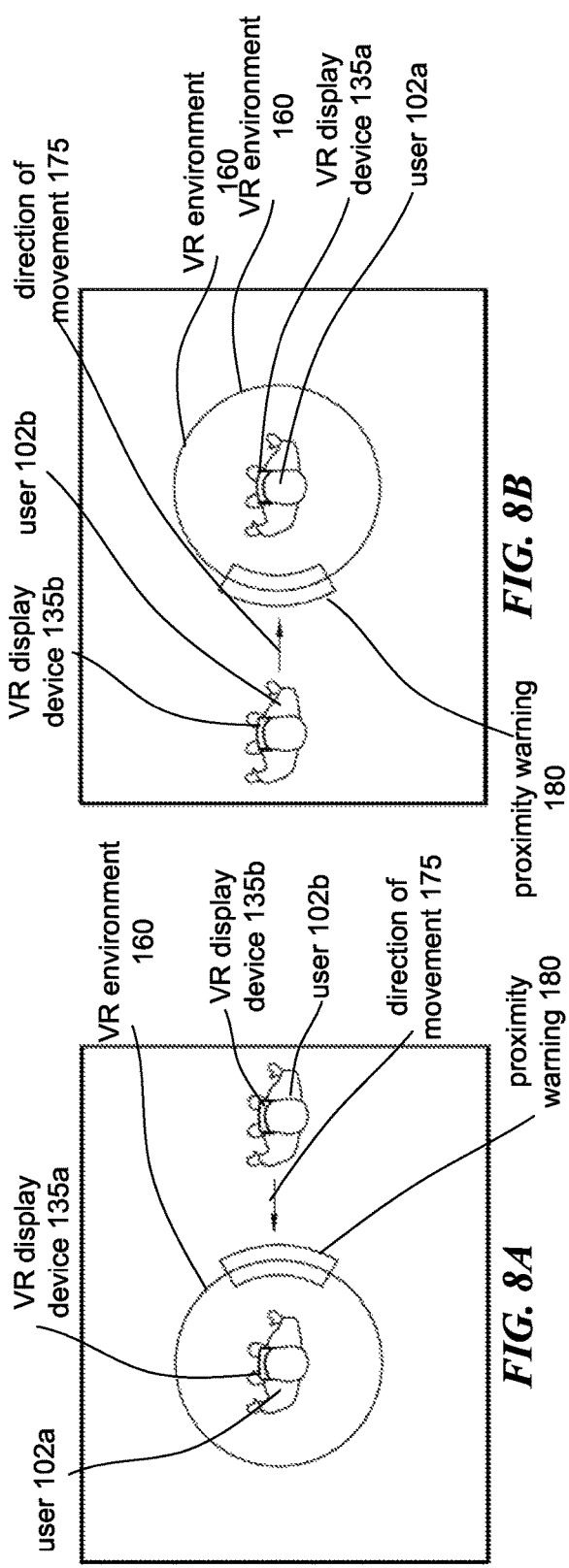
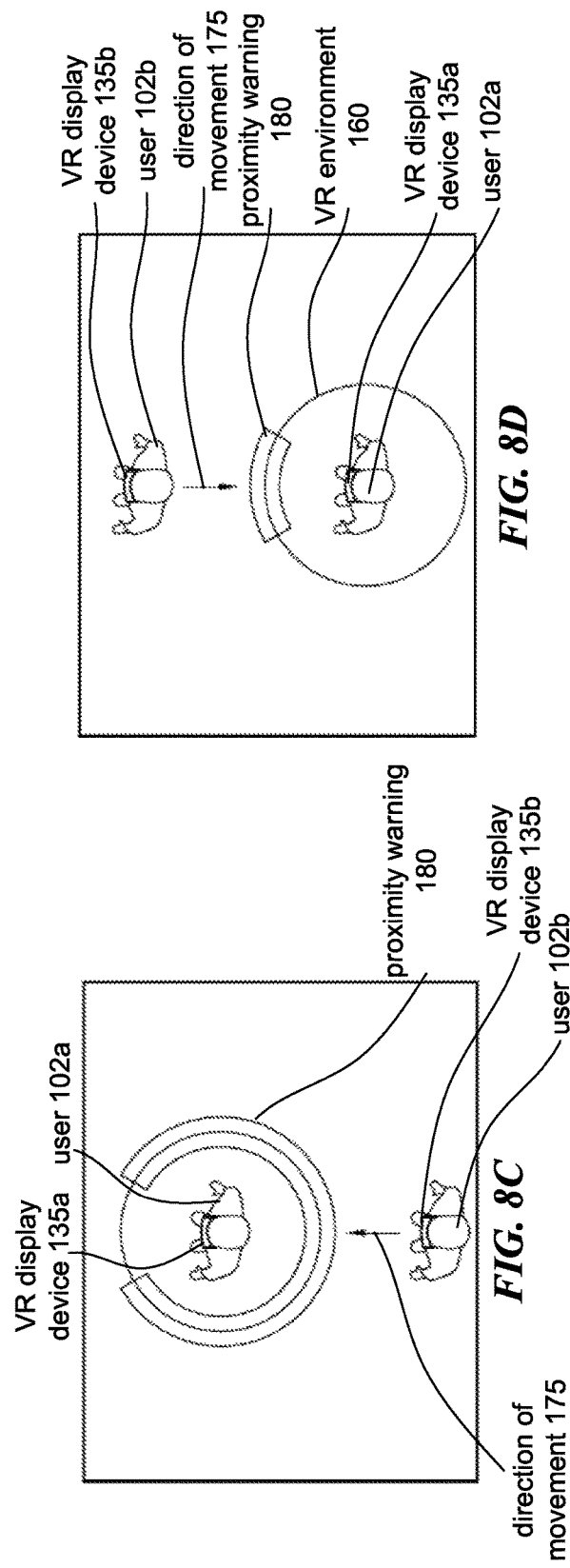

SPATIAL ANCHOR SHARING FOR MULTIPLE VIRTUAL REALITY SYSTEMS IN SHARED REAL-WORLD ENVIRONMENTS

TECHNICAL FIELD

This disclosure generally relates to databases and file management within network environments, and in particular relates to interacting with users in a virtual reality (VR) setting.

BACKGROUND

Traditional methods of spatial awareness for two or more users in VR settings within a shared real-world space require external sensors to track users, e.g., by setting up an external camera or sensor to track the users. However, for systems that do not have external cameras or sensors tracking the users, it may be difficult to ensure users are accurately represented in the VR space such that they match their real-world positions. Additionally, it may be difficult to ensure user safety such that users do not bump into each other. Even if the users wore external cameras or sensors, the users may not be accurately represented in the VR space relative to one another if the users are facing away from each other.

SUMMARY OF PARTICULAR EMBODIMENTS

In particular embodiments, two or more users in a shared real-world environment may risk running into or hitting one another while immersed in a VR environment. Particularly, if a user is not within the field of view of an external camera on a VR display device or headset of another user, the VR system may not be able to determine the location of the user relative to the other user and prevent collisions. Thus, one technical challenge may include managing spatial awareness while users are immersed in a VR experience. One solution presented by the embodiments disclosed herein to address the technical challenge of managing spatial awareness may be to identify one or more objects, features, or fixtures in the real-world environment as "anchor points" which may be used to localize two or more users relative to one another. The anchor points may be used to determine the pose of two or more VR display devices to the anchor point, and thus, the pose of the two or more VR display devices to one another. As such, a VR display device may localize or orient each itself relative to another VR display device. Localization information may be used to provide proximity warnings to each VR display device based on a determination that another VR display device is approaching within a threshold distance to the VR display device, thus alerting the user of the VR display device of any potential collision while immersed in the VR experience.

In particular embodiments, one or more computing systems may capture, by a first VR display device, one or more frames of a shared real-world environment. The one or more computing systems may identify, by the first VR display device, one or more anchor points within the shared real-world environment from the one or more frames. The one or more computing systems may receive, by the first VR display device, localization information with respect to a second VR display device in the shared real-world environment. The one or more computing systems may determine, by the first VR display device, a pose of the first VR display device with respect to the second VR display device based on the localization information. The one or more computing systems may render, for one or more displays of the first VR display device, a first output image comprising a proximity warning with respect to the second VR display device based on determining the pose of the first VR display device with respect to the second VR display device is within a threshold distance.

Certain technical challenges exist for managing spatial awareness in a VR setting. One technical challenge may include localizing other VR users using external cameras on the VR display device when the other user is not within the field of view of the external cameras. The solution presented by the embodiments disclosed herein to address this challenge may be to localize two or more users to an object within both user's fields of views. Another technical challenge may include ensuring the safety of two or more VR users within a shared real-world environment. The solution presented by the embodiments disclosed herein to address this challenge may be to provide proximity warnings on a display of a first VR display device based on a determination that a second VR display device is approaching the first VR display device.

Certain embodiments disclosed herein may provide one or more technical advantages. A technical advantage of the embodiments may include providing spatial information by providing a first user a quick glimpse of the real-world environment through directional passthrough views of the real-world environment while immersed in the VR environment, or providing outline renderings of one or more other users in the VR environment to alert the first user of the one or more other users that may lie in their path without significantly disrupting the immersion of the VR experience. Another technical advantage of the embodiments may include providing spatial information by determining the optimal direction for a proximity warning. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 8A-D illustrate example views of a second VR display device approaching a first VR display device.

DESCRIPTION OF EXAMPLE EMBODIMENTS

Figure 1A:
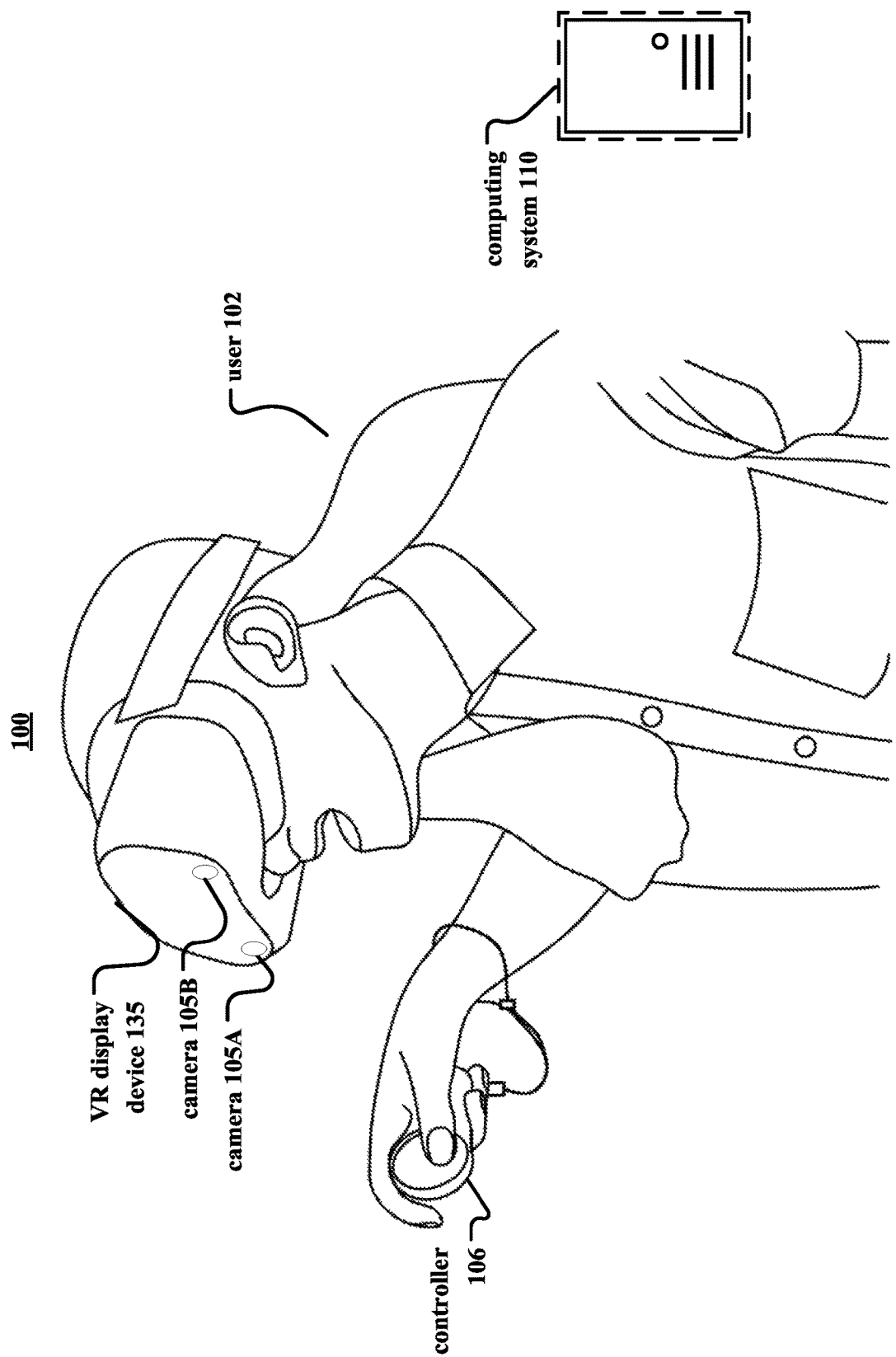
FIG. 1A illustrates an example virtual reality system worn by a user.

In particular embodiments, two or more users in a shared real-world environment may risk running into or hitting one another while immersed in a VR environment. In the scenario where there are two VR display devices or headsets within the field of view of each other (e.g., the external camera on each device can see the other device), then the device may orient with respect to each other directly. As an example and not by way of limitation, either or both of the VR display devices or headsets may use optical recognition to identify and determine a pose of the other device in the shared real-world environment (e.g., using object recognition to identify the other VR headset, or capturing a QR code or other unique identifier on the other VR headset). However, if a user is not within the field of view of an external camera on a VR display device or headset of another user, the VR system may not be able to determine the location of the user relative to the other user and prevent collisions. Thus, one technical challenge may include managing spatial awareness while users are immersed in a VR experience. One solution presented by the embodiments disclosed herein to address the technical challenge of managing spatial awareness may be to identify one or more objects, features, or fixtures in the real-world environment as "anchor points" which may be used to localize two or more users relative to one another. The anchor points may be used to determine the pose of two or more VR display devices to the anchor point, and thus, the pose of the two or more VR display devices to one another. As such, a VR display device may localize or orient each itself relative to another VR display device. Localization information may be used to provide proximity warnings to each VR display device based on a determination that another VR display device is approaching within a threshold distance to the VR display device, thus alerting a user of the VR display device of any potential collision while immersed in the VR experience.

In particular embodiments, a virtual reality (VR) application may be able to incorporate mixed reality (MR) renderings of real-world objects from the real-world environment into a VR environment. However, the VR application may be limited to changing the appearance of the real-world object when it is rendered as a MR object. Thus, one technical challenge may be identifying and leveraging real-world objects across different VR platforms to utilize real-world objects effectively within VR environments. One solution presented by the embodiments disclosed herein to address the technical challenge of identifying and leveraging real-world objects to be generated as MR content in VR environments is by determining the underlying attributes (such as size, shape, function) of a real-world object to effectively integrate the real-world object into the VR environment as an MR object. That is, a VR system may use the attribute information of a real-world object to determine a suitable functionality for the MR object in the VR environment. The functionality of an MR object includes the set of functions or capabilities associated with the MR object. The set of functions or capabilities may be defined by the VR application. The VR application may apply one or more MR functionalities of a real-world objects based on the attributes of real-world object. Thus, the embodiments disclosed herein may help users capture their real-world environments and then make this data accessible to other VR applications as an MR platform they can plug into—a so-called "platformization" of the MR objects. Although this disclosure describes incorporating mixed-reality content in particular VR applications in a particular manner, this disclosure contemplates incorporating mixed-reality content in any suitable application in any suitable manner. As an example, this disclosure contemplates incorporating mixed-reality content into augmented reality (AR) applications, where the AR system may use the attribute information of a real-world object to determine a suitable MR functionality to apply to the real-world object in the AR environment.

FIG. 1A illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). In particular embodiments, the VR display device 135 may comprise one or more external-facing cameras, such as the two forward-facing cameras 105A and 105B, which can capture images and videos of the real-world environment. As illustrated in FIG. 1A, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding the user 102, as their vision is shielded by the VR display device 135. As such, the passthrough feature described herein may be technically advantageous for providing the user with real-time visual information about their physical surroundings.

Figure 1B:
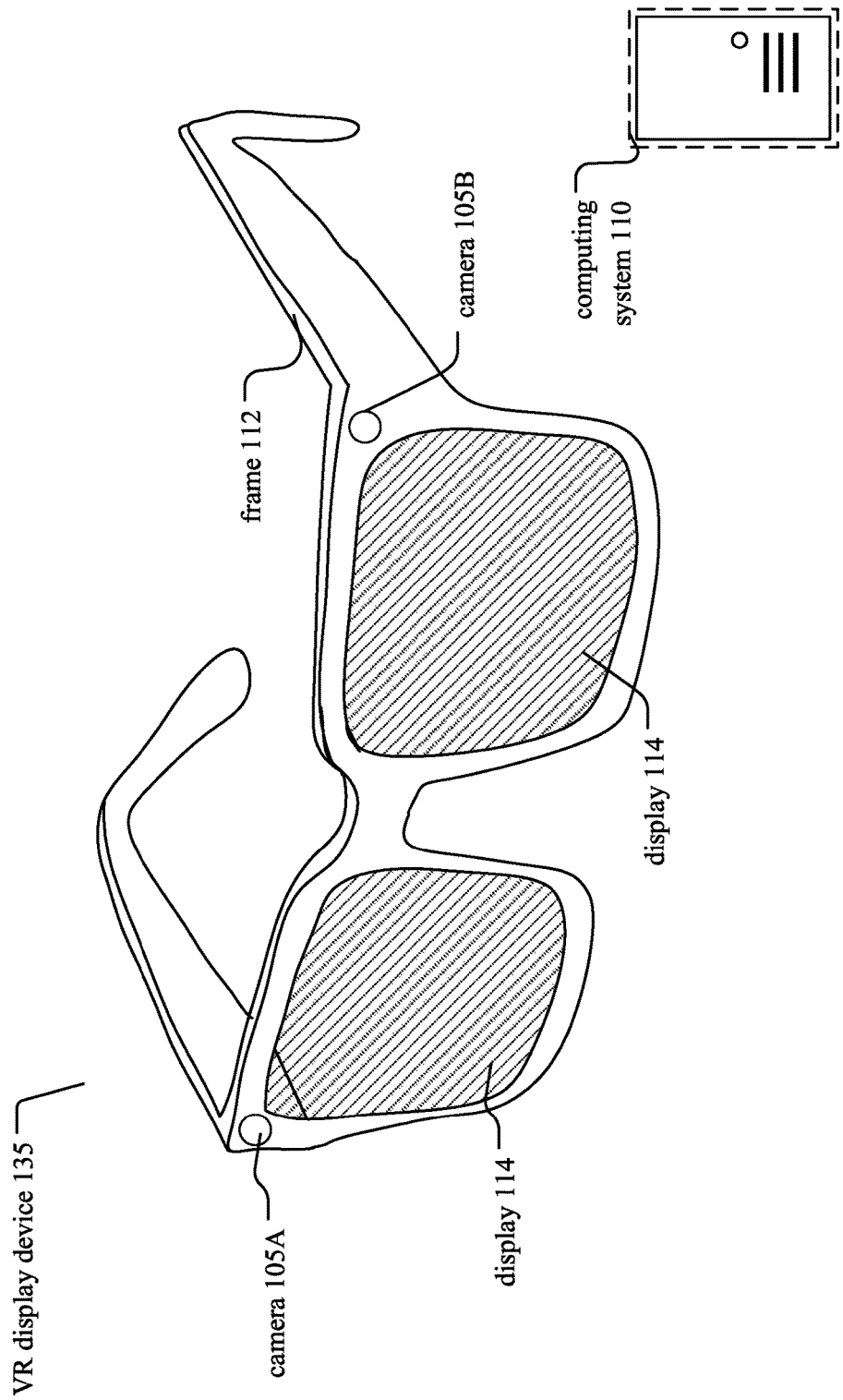
FIG. 1B illustrates an example augmented reality system.

FIG. 1B illustrates an example augmented reality system 101. The augmented reality system 101 may include a head-mounted display VR display device 135 comprising a frame 112, one or more displays 114, and one or more computing systems 110. The VR display device 135 may be worn over the user's eyes (e.g., like eyeglasses) and provide visual content to a user 102 (not shown) through displays 114. The displays 114 may be transparent or translucent allowing a user wearing the VR display device 135 to look through the displays 114 to see the real-world environment and displaying visual artificial reality content to the user at the same time. The VR display device 135 may include an audio device that may provide audio artificial reality content to users. The VR display device 135 may include one or more external-facing cameras, such as the two forward-facing cameras 105A and 105B, which can capture images and videos of the real-world environment. The VR display device 135 may include an eye tracking system to track the vergence movement of the user wearing the VR display device 135. The augmented reality system 101 may further include a controller 106 (not shown) comprising a trackpad and one or more buttons. The controller 106 may receive inputs from users and relay the inputs to the computing system 110. The controller 106 may also provide haptic feedback to users. The computing system 110 may be connected to the VR display device 135 and the controller through cables or wireless connections. The computing system 110 may control the VR display device 135 and the controller to provide the augmented reality content to and receive inputs from users. The computing system 110 may be a standalone host computer system, an on-board computer system integrated with the VR display device 135, a mobile computing device, or any other hardware platform capable of providing artificial reality content to and receiving inputs from users.

Figure 2:
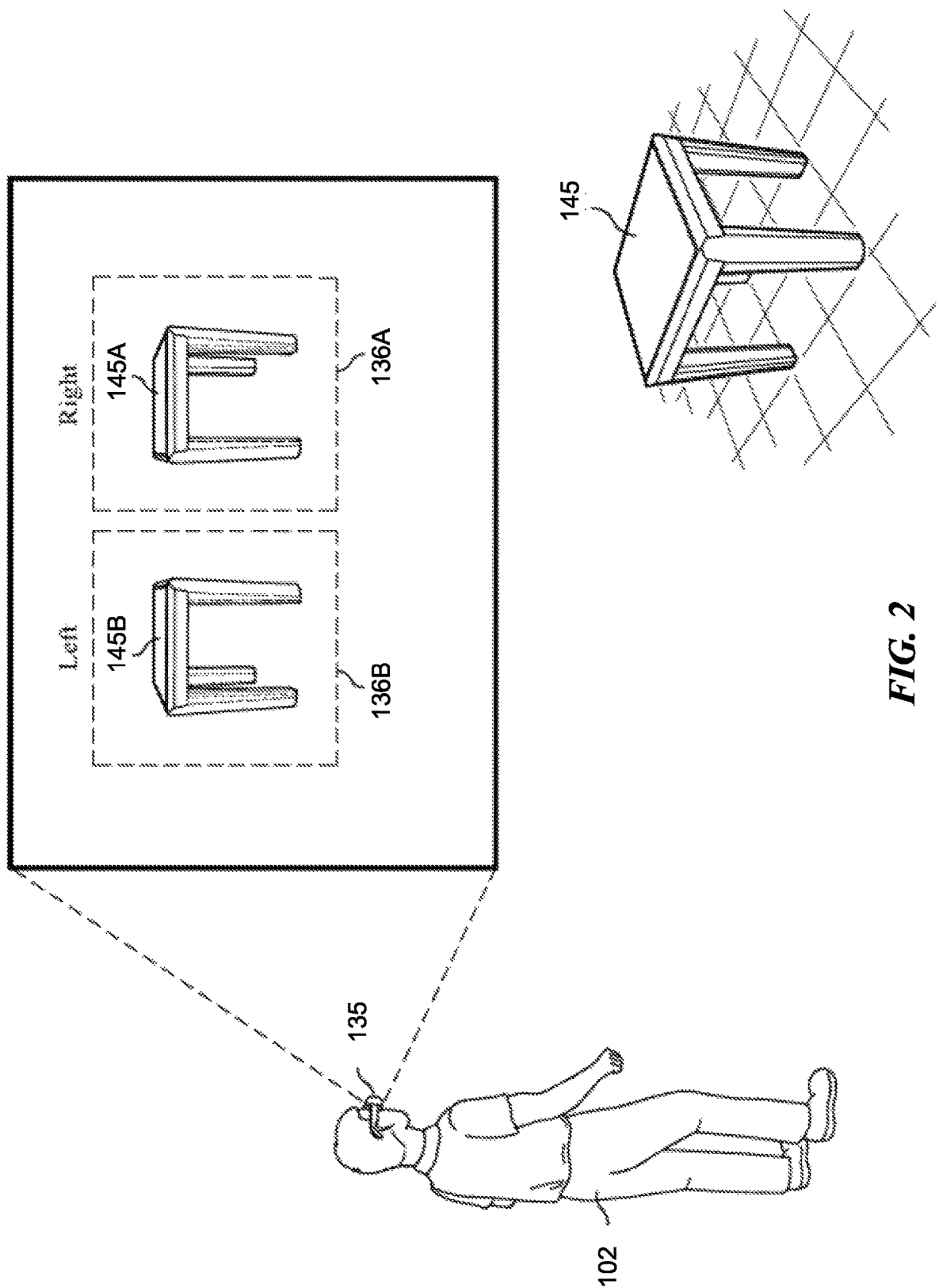
FIG. 2 illustrates an example of a passthrough feature of a virtual reality system.

FIG. 2 illustrates an example of the passthrough feature of a virtual reality system 100. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive their physical surroundings while wearing the VR display device 135, the passthrough feature captures information about the physical environment using, for example, one or more cameras 105 such as external-facing cameras 105A-B. The captured information may then be re-projected to the user 102 based on their viewpoints. In particular embodiments where the VR display device 135 has a right display 136A for the user's right eye and a left display 136B for the user's left eye, the virtual reality system 100 may individually render (1) a re-projected view 145A of the physical environment for the right display 135a based on a viewpoint of the user's right eye and (2) a re-projected view 145B of the physical environment for the left display 135b based on a viewpoint of the user's left eye.

Referring again to FIG. 1A, the VR display device 135 may have external-facing cameras, such as the two forward-facing cameras 105A and 105B shown in FIG. 1A. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, the virtual reality system 100 could use triangulation techniques to compute the depth of the observed feature. For example, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., x-y-z position and r-p-y orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device 135). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 3:
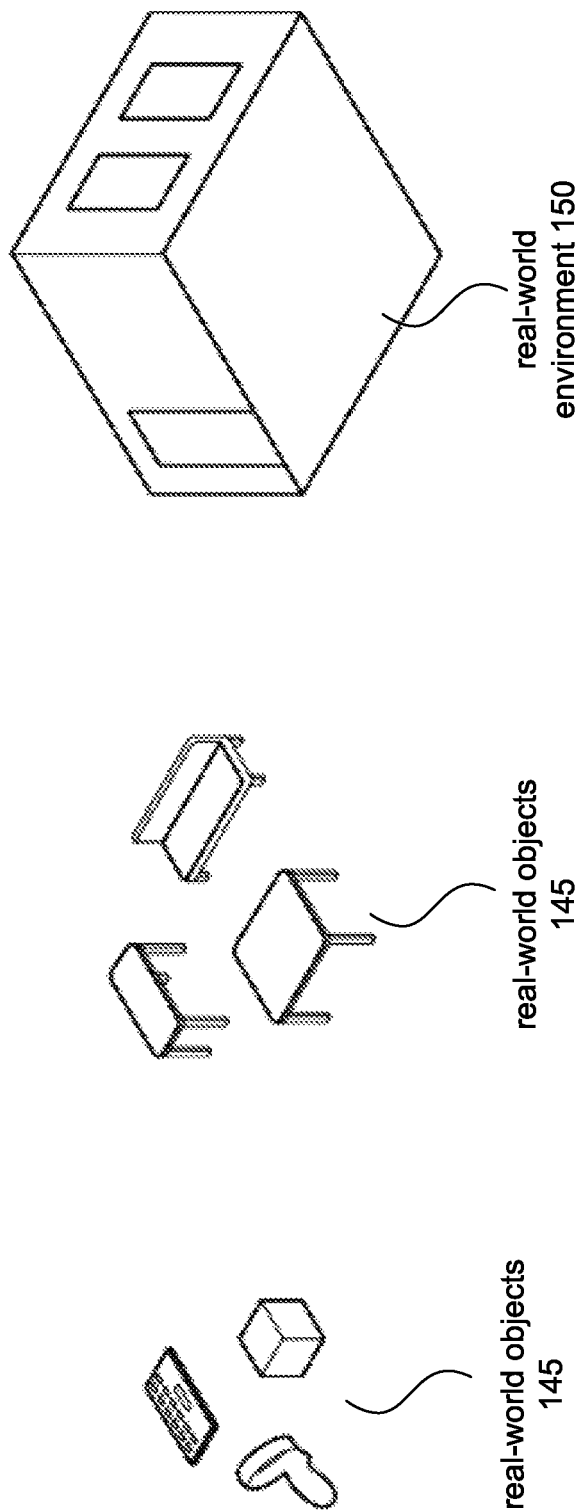
FIG. 3 illustrates components of a VR system.
Figure 4:
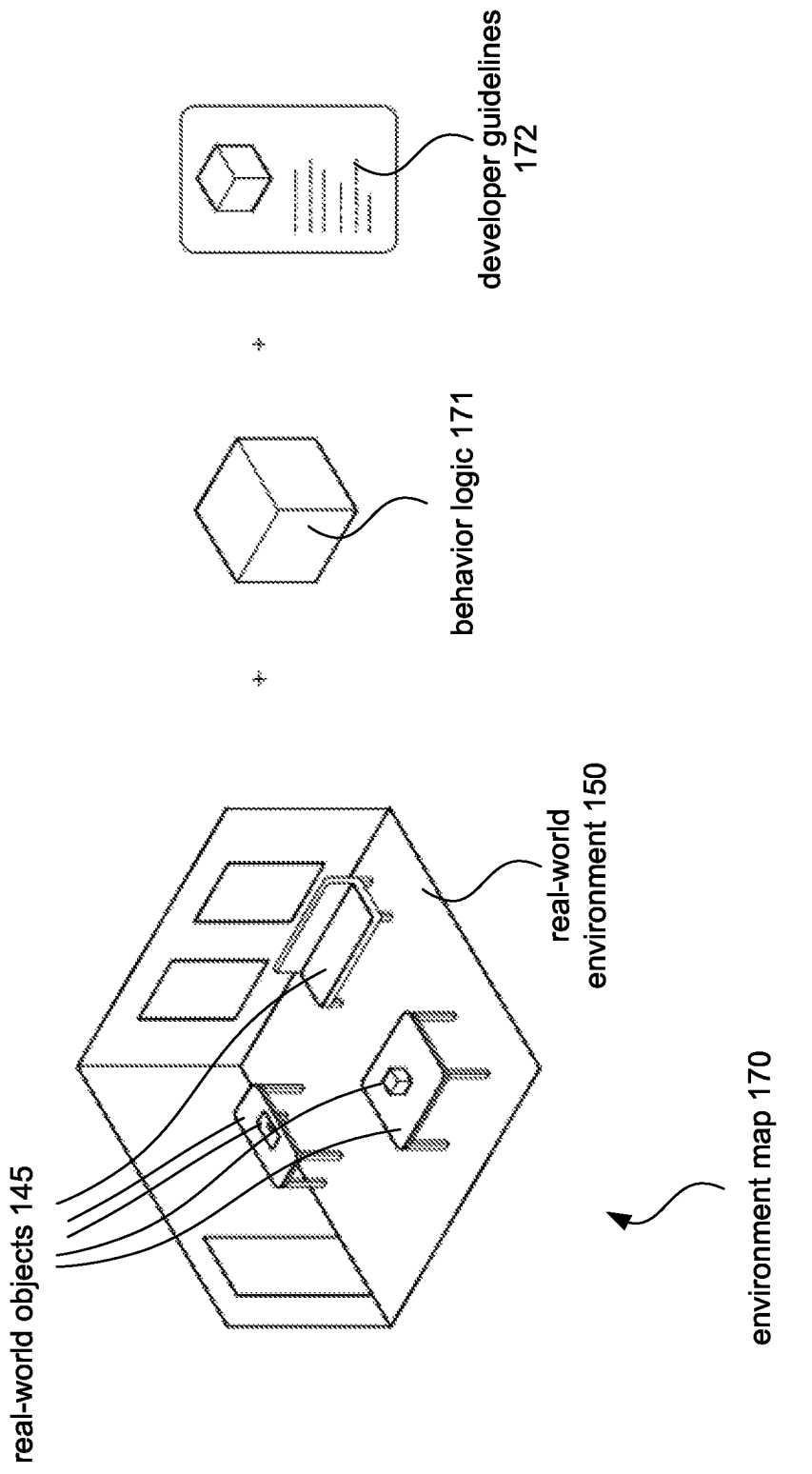
FIGS. 4-5 illustrates example environment maps.
Figure 5:
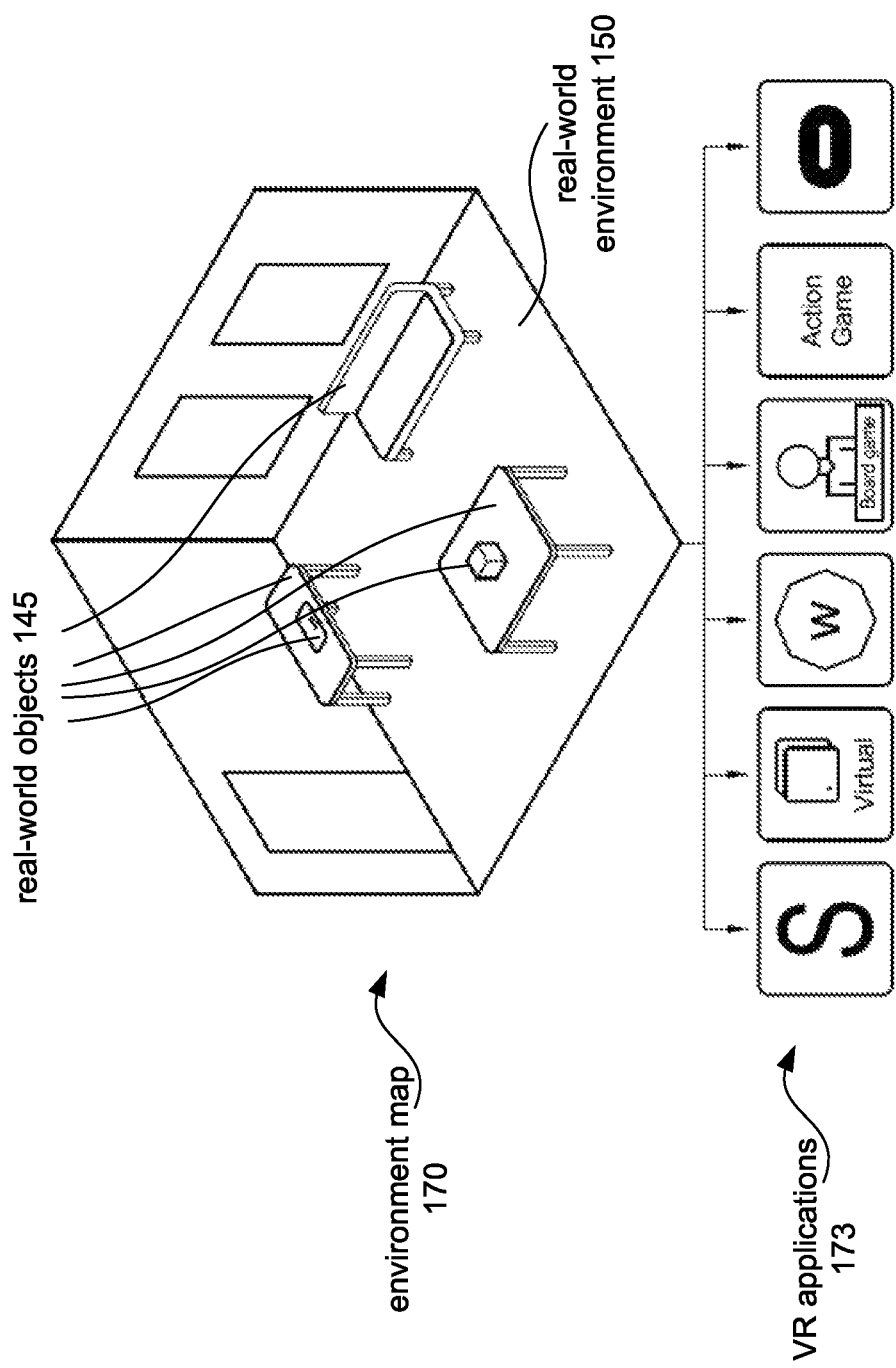

FIG. 3 illustrates components of the VR system 100. There are real-world objects 145 and real-world environments 150. The real-world objects can include items (such as keyboards, cups, controllers, etc.) and furniture (such as desks, chairs, couches, etc.). The real-world environment 150 may correspond to a user's office, living room, kitchen, etc. FIGS. 4-5 illustrate example environment maps 170. With reference to FIG. 4, the environment map 170 comprises the one or more real-world objects 145 in the real-world environment 150. The environment map 170 may be provided to VR applications, alongside behavior logic 171 (e.g., which may include real-world object identification, MR object identification, safe traversal and interaction information, etc.) and developer guidelines 172 (e.g., best practices, how to use and how not to use the real-world and MR objects, etc.). With reference to FIG. 5, a number of different VR applications 173 may utilize the environment map 170 to generate a MR experience for the user. For example, a VR media streaming application may utilize a real-world chair as an MR couch for the user to sit on while watching a movie with other VR users (who may be represented as VR avatars sitting on the same MR couch to create a co-presence experience). As another example, a VR board game application may utilize a real-world table as an MR play area for board game, for the user to sit at so the user can virtually play a board game against other VR users (who may be represented as VR avatars around the MR play area to create a co-presence experience).

In particular embodiments, the VR system 100 may receive an instruction to transition to a first VR environment 160 of a first VR application 173. The user may select a VR application 173, which may instruct the VR system 100 to initiate a VR experience by transitioning to a VR environment. As an example and not by way of limitation, the user may select a VR media streaming application, and the VR system will receive an instruction to transition to a VR movie theater environment. Although this disclosure describes the VR system 100 receiving instructions in a particular manner, this disclosure contemplates the VR system 100 receiving instructions in any suitable manner.

Figure 6:
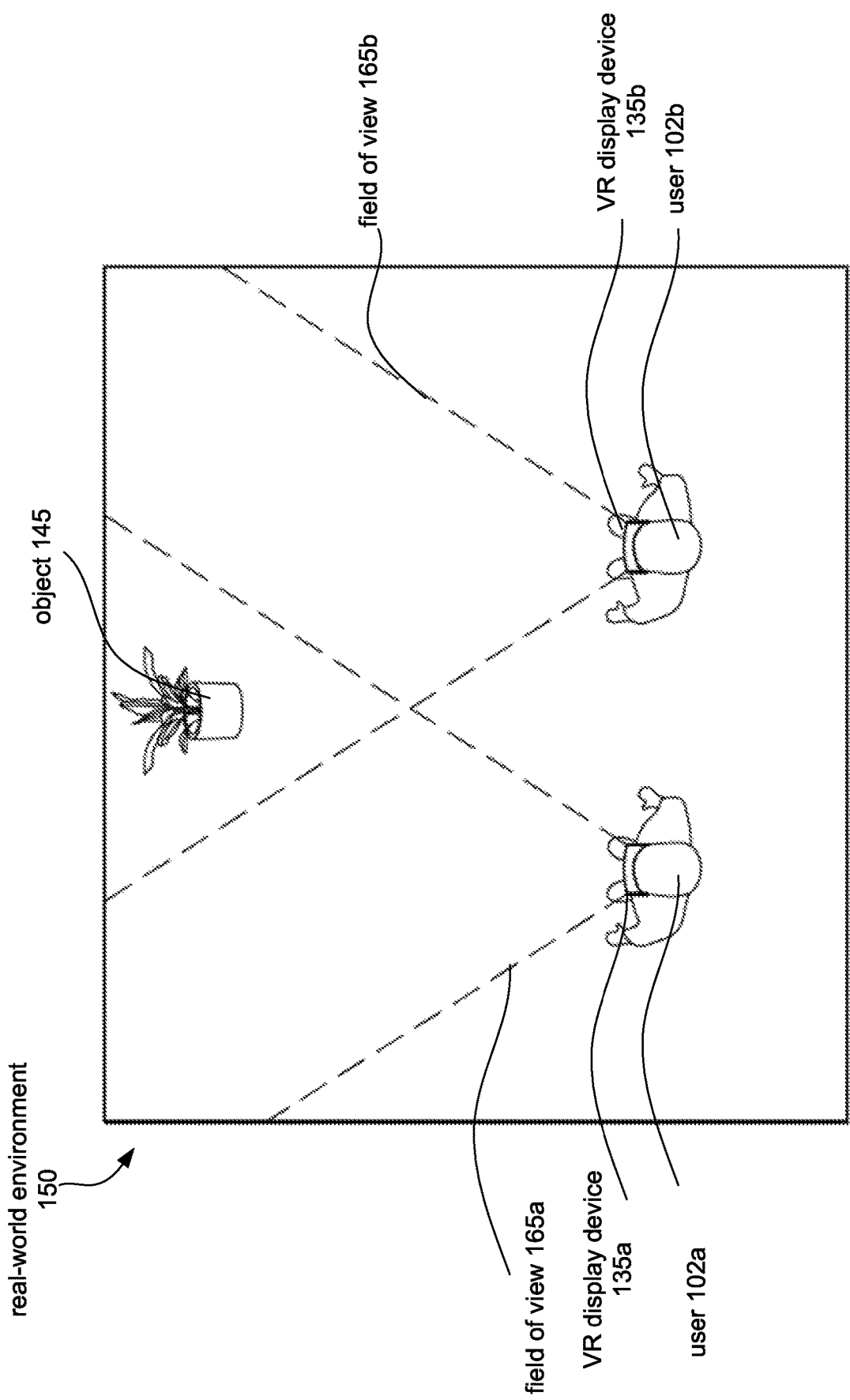
FIG. 6 illustrates an example view of two VR display devices within a real-world environment.

FIG. 6 illustrates an example view of two VR display devices 135a and 135b within a real-world environment 150. Two or more users 102a and 102b wearing VR display devices 135a and 135b may have a field of view 165a and 165b. Within the field of view of both users 102a and 102b may be one or more objects 145. As an example and not by way of limitation, a plant may be within the field of view 165a, 165b of both users 102a and 102b.

In particular embodiments, the VR system 100 may capture, by a first VR display device (e.g., the VR display device 135a), one or more frames of a shared real-world environment 150. The VR display device 135a may then capture an image of the real-world environment 150 and one or more of the objects 145 within the field of view 165a of the VR display device 135a. As an example and not by way of limitation, the VR display device 135a may capture an image of the real-world environment 150 containing a plant, furniture, fixture, feature, etc. within the real-world environment 150. Although this disclosure describes capturing one or more frames of a real-world environment 150 in a particular manner, this disclosure contemplates capturing one or more frames of a real-world environment 150 in any suitable manner.

In particular embodiments, the VR system 100 may identify, by the first VR display device (e.g., the VR display device 135a), one or more anchor points within the shared real-world environment 150 from the one or more frames. The one or more anchor points may comprise one or more of an object 145, a boundary, feature, or fixture within the shared real-world environment 150. As an example and not by way of limitation, the anchor point may be the object 145 in the real-world environment 150, or a boundary wall determined by one or more of the users 102a, 102b or the VR system 100. There can be multiple anchor points such that as the field of view 165a, 165b moves to cover different portions of the real-world environment 150, an anchor point may always be identified. The VR system 100 may identify the one or more anchor points using one or more first external cameras (e.g., cameras 105) of the first VR display device (e.g., the VR display device 135a with a first field of view 165a). The VR system 100 may identify the one or more anchor points using one or more second external cameras (e.g., cameras 105) of the second VR display device (e.g., the VR display device 135b with a second field of view 165b). The first VR display device 135a may or may not be in the field of view 165b of the second VR display device 135b, and the second VR display device 135b may or may not be in the field of view 165a of the first VR display device 135a. However, the one or more anchor points may be in both the field of view 165a, 165b of the VR display device 135a, 135b. Although this disclosure describes identifying anchor points in a particular manner, this disclosure contemplates identifying anchor points in any suitable manner.

One technical challenge may include localizing other users wearing VR display devices using external cameras on the VR display device when the other user is not within the field of view of the external cameras. The solution presented by the embodiments disclosed herein to address this challenge may be to localize two or more users to an object within both user's fields of views. In particular embodiments, the VR system may receive, by the first VR display device (e.g., the VR display device 135a), localization information with respect to a second VR display device (e.g., the VR display device 135b) in the shared real-world environment 150. As both VR display devices 135a, 135b may localize themselves relative to the anchor point (e.g., the object 145), each VR display device 135a, 135b may communicate localization information (e.g., position information) to one another. As the VR display devices 135a, 135b may determine localization information in the real-world environment 150 based on the anchor point, neither VR display device 135a, 135b need to have the other within their field of view 165a, 165b. In particular embodiments, either or both of the VR display devices 135a, 135b or headsets may use optical recognition to determine localization information (e.g., localizing one user relative to another user) by capturing a QR code or other unique identifier located on an object 145 within the real-world environment 150. That is, each VR display device 135a, 135b or headset may identify one or more unique identifiers or QR codes to determine localization information with respect to the real-world environment 150 and each other, without requiring each VR display device 135a, 135b be within a field of view of one another. The one or more anchor points within the real-world environment 150 may serve as the unique identifiers or QR codes. As an example and not by way of limitation, the anchor point/unique identifier/QR code may be placed on any suitable surface, such as a desk, wall, corner, couch, etc. Additionally, multiple anchor points/unique identifiers/QR codes may be used to define the dimensions of an object (e.g., by placing one QR code on a first corner of a desk, and a second QR code on a second corner of a desk). Multiple anchor points/unique identifiers/QR codes may be used to determine spatial awareness of the two or more VR display devices 135a, 135b. As an example and not by way of limitation, if two or more QR codes are in a known alignment within a room, then a first VR display device 135a may determine their alignment relative to the two or more QR codes, a second VR display device 135b may determine their alignment relative to the two or more QR codes, and thus the two or more VR display devices 135a, 135b may determine their alignments relative to one another. In particular embodiments and as an example and not by way of limitation, the first VR display device 135a may receive position information of the second VR display device 135b from the second VR display device 135b, thus providing the first VR display device 135a position information of both the first VR display device 135a and the second VR display device 135b. Although this disclosure describes receiving localization information in a particular manner, this disclosure contemplates receiving localization information in a particular manner in any suitable manner.

In particular embodiments, the VR system 100 may determine, by the first VR display device 135a, a pose of the first VR display device 135a with respect to the second VR display device 135b based on the localization information. As each VR display device 135a, 135b may know the position and orientation of each VR display device 135a, 135b to the anchor point, the VR system 100 may determine a position and orientation of each VR display device 135a, 135b with respect to one another. As an example and not by way of limitation, the VR display devices 135a, 135b may use position and orientation sensors to determine a distance and orientation of each VR display device 135a, 135b to the anchor point (e.g., a plant in the real-world environment 150), and then calculate, based on the determined distances and orientations (e.g., angles) of the VR display devices 135a, 135b to the anchor point, the position/distance and orientation of each of the VR display devise 135a, 135b with respect to one another. Although this disclosure describes determining poses of VR display devices in a particular manner, this disclosure contemplates determining poses of VR display devices in any suitable manner.

Figure 7:
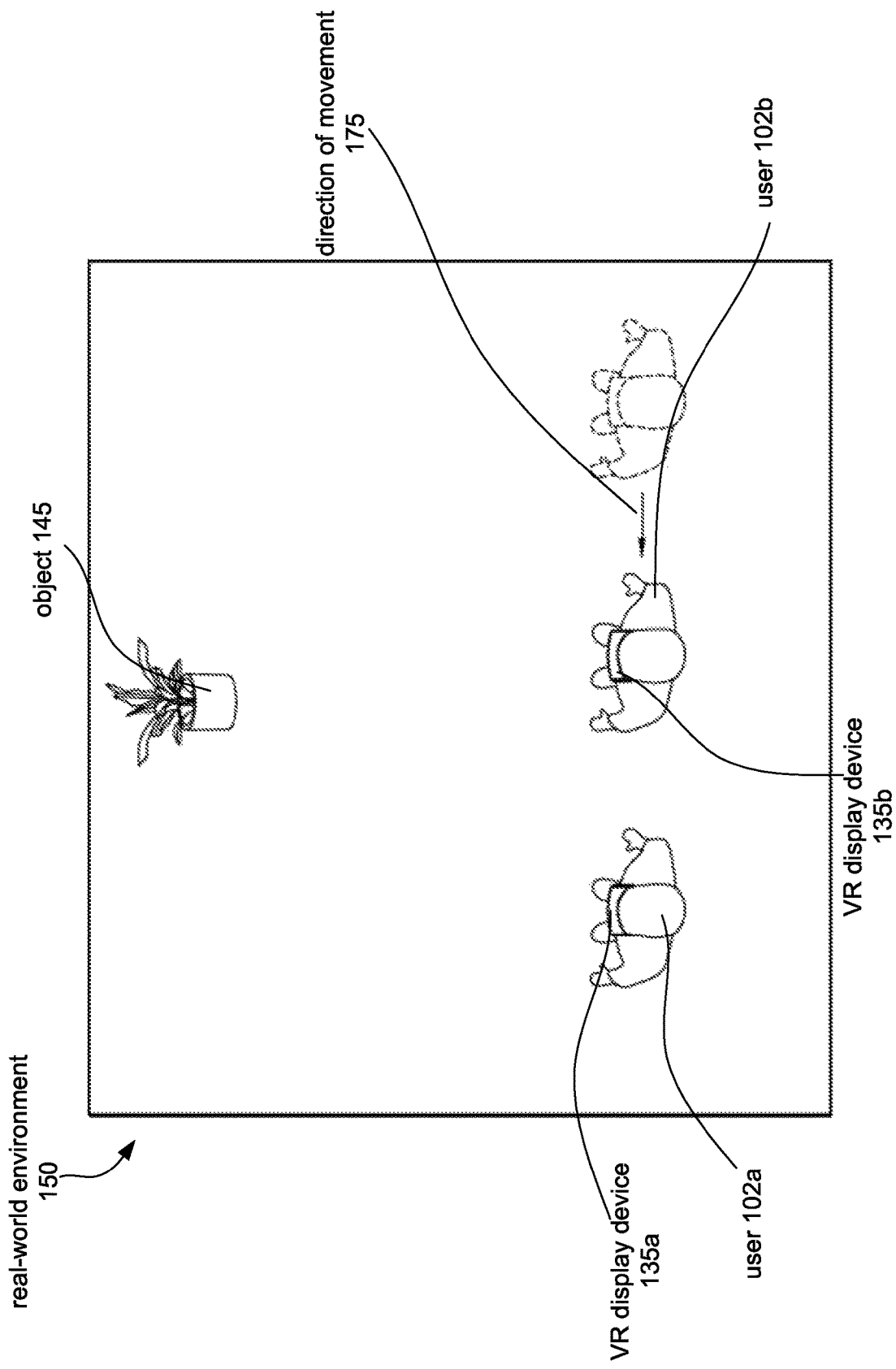
FIG. 7 illustrates an example view of a second VR display device approaching a first VR display device.

FIG. 7 illustrates an example view of a second VR display device (e.g., the VR display device 135b) approaching a first VR display device (e.g., the VR display device 135a). The second VR display device 135b may be approaching the first VR display device 135a with a direction of movement 175.

One technical challenge may include ensuring the safety of two or more VR users within a shared real-world environment. The solution presented by the embodiments disclosed herein to address this challenge may be to provide proximity warnings on a display of a first VR display device based on a determination that a second VR display device is approaching the first VR display device. In particular embodiments, the VR system 100 may render, for one or more displays 114 of the first VR display device 135a, a first output image comprising a proximity warning with respect to the second VR display device 135b based on determining the pose of the first VR display device 135a with respect to the second VR display device 135b is within a threshold distance. That is, if the second VR display device 135b approaches within a predetermined distance to the first VR display device 135a, the VR system may direct the first VR display device 135a to provide a proximity warning indicating that another VR display device (and accordingly, another user 102b) is approaching the first VR display device 135a (and accordingly, the user 102a) to ensure user safety during the VR experience. This proximity warning may be issued even when the risk of collision comes from a user or object that is outside of the field of view 165 of the user 102. As an example and not by way of limitation, if the user 102b wearing the VR display device 135b approaches within a threshold distance (e.g., 1 meter) of the user 102a wearing the VR display device 135a, an output image comprising a proximity warning may be rendered on the display 114 of the VR display device 135a to alert the user 102a another user 102b is approaching the user 102a. Additionally, the VR system 100 may determine a pose of the first VR display device 135a with respect to one or more anchor points (e.g., one or more objects 145 in the real-world environment 150), determine a pose of the second VR display device 135b with respect to one or more anchor points (e.g., one or more objects 145 in the real-world environment 150), and determine a distance between the first and second VR display devices 135a, 135b based on the pose of the VR display device 135a to the anchor point and the VR display device 135b to the anchor point. As an example and not by way of limitation, if a pose (e.g., position and orientation) between a first VR display device 135a and an anchor point is known, and a pose between a second VR display device 135b and an anchor point is known, the distance between the first and second VR display devices 135a, 135b may be calculated. Accordingly, if the distance between the first and second VR display devices 135a, 135b is determined, then the VR system 100 may determine wither the distance between the first VR display device 135a and the second VR display device 135b is within the threshold distance. Although this disclosure describes rending an output image comprising a proximity warning in a particular manner, this disclosure contemplates rending an output image comprising a proximity warning in any suitable manner.

FIGS. 8A-D illustrate example views of a second user 102b wearing a second VR display device 135b with a direction of movement 175 approaching a first user 102a wearing a first VR display device 135a. Based on the second user 102b direction of movement 175 and approach toward the first user 102a, the VR display device 135a may display a proximity warning 180. The proximity warning may be a haptic alert. As an example and not by way of limitation, one or more of the VR display device 135 and/or the controllers 106 may pulse or vibrate to alert the user 102 of an impending collision with another user or obstacle. The haptic alert may be directional, such that a potential collision from the right of the user 102 may cause the right-hand controller 106 to provide the haptic alert. The frequency of the haptic alert may increase as the potential for collision increases. The proximity warning may be an auditory alert. As an example and not by way of limitation, VR display device 135 may play a tone, sound, or other noise to alert the user 102 of an impending collision with another user or obstacle. The auditory alert may be directional, such that a potential collision from the right of the user 102 may cause a right-side speaker of the VR display device 135 to provide the auditory alert. The frequency of the auditory alert may increase as the potential for collision increases. The proximity warning may be a visual alert. As an example and not by way of limitation, VR display device 135 may display or render a flashing light, glow, passthrough view, or other visual cue to alert the user 102 of an impending collision with another user or obstacle. The visual alert may be directional, such that a potential collision from the right of the user 102 may cause a right portion of the VR display device 135 to provide the visual alert. The intensity or size of the portion of the visual alert may increase as the potential for collision increases. The proximity warning may be based on determining a relative speed of one VR display device with respect to another VR display device. If a second VR display device 135b is approaching the first VR display device 135a with a direction of movement 175 with a speed greater than a threshold speed (e.g., 5 miles per hour), the VR system 100 may render a proximity warning on the first VR display device 135a. As an example and not by way of limitation, if the second user 102b wearing the second VR display device 135b is jogging or running towards the first user 102a wearing the first VR display device 135a, the first VR display device 135a may render a proximity warning to alert the first user 102a of the rapidly approaching second user 102b.

In particular embodiments, the VR system 100 may determine a direction of approach of the second VR display device 135b relative to the first VR display device 135a. The proximity warning rendered on the first VR display device 135a may comprise an indication of the direction of approach of the second VR display device 135b. FIG. 8A illustrates a second user 102b wearing a second VR display device 135b approaching a first user 102a wearing a first VR display device 135a from the right of the first user 102a. That is, the direction of approach (e.g., the direction of movement 175) of the second VR display device 135b is perpendicular to the field of view 165 of the first VR display device 135a. Accordingly, the proximity warning 180 may be rendered in a peripheral view of the first VR display device 135a to indicate the direction of approach of the second VR display device 135b is perpendicular (and to the right) to the field of view 165a. FIG. 8B illustrates a second user 102b wearing a second VR display device 135b approaching a first user 102a wearing a first VR display device 135a from the left of the first user 102a. That is, the direction of approach (e.g., the direction of movement 175) of the second VR display device 135b is perpendicular to the field of view 165 of the first VR display device 135a. Accordingly, the proximity warning 180 may be rendered in a peripheral view of the first VR display device 135a to indicate the direction of approach of the second VR display device 135b is perpendicular (and to the left) to the field of view 165a. FIG. 8C illustrates a second user 102b wearing a second VR display device 135b approaching a first user 102a wearing a first VR display device 135a from behind of the first user 102a. That is, the direction of approach (e.g., the direction of movement 175) of the second VR display device 135*b* is away from the field of view 165 of the first VR display device 135*a*. Accordingly, the proximity warning 180 may be rendered in a peripheral view of and behind the first VR display device 135*a* to indicate the direction of approach of the second VR display device 135*b* is behind the field of view 165*a*. FIG. 8D illustrates a second user 102*b* wearing a second VR display device 135*b* approaching a first user 102*a* wearing a first VR display device 135*a* from the front of the first user 102*a*. That is, the direction of approach (e.g., the direction of movement 175) of the second VR display device 135*b* is toward the field of view 165 of the first VR display device 135*a*. Accordingly, the proximity warning 180 may be rendered in the field of view 165 the first VR display device 135*a* to indicate the direction of approach of the second VR display device 135*b* is within the field of view 165*a*. A technical advantage of the embodiments may include providing spatial information by determining the optimal direction for a proximity warning.

Figure 9:
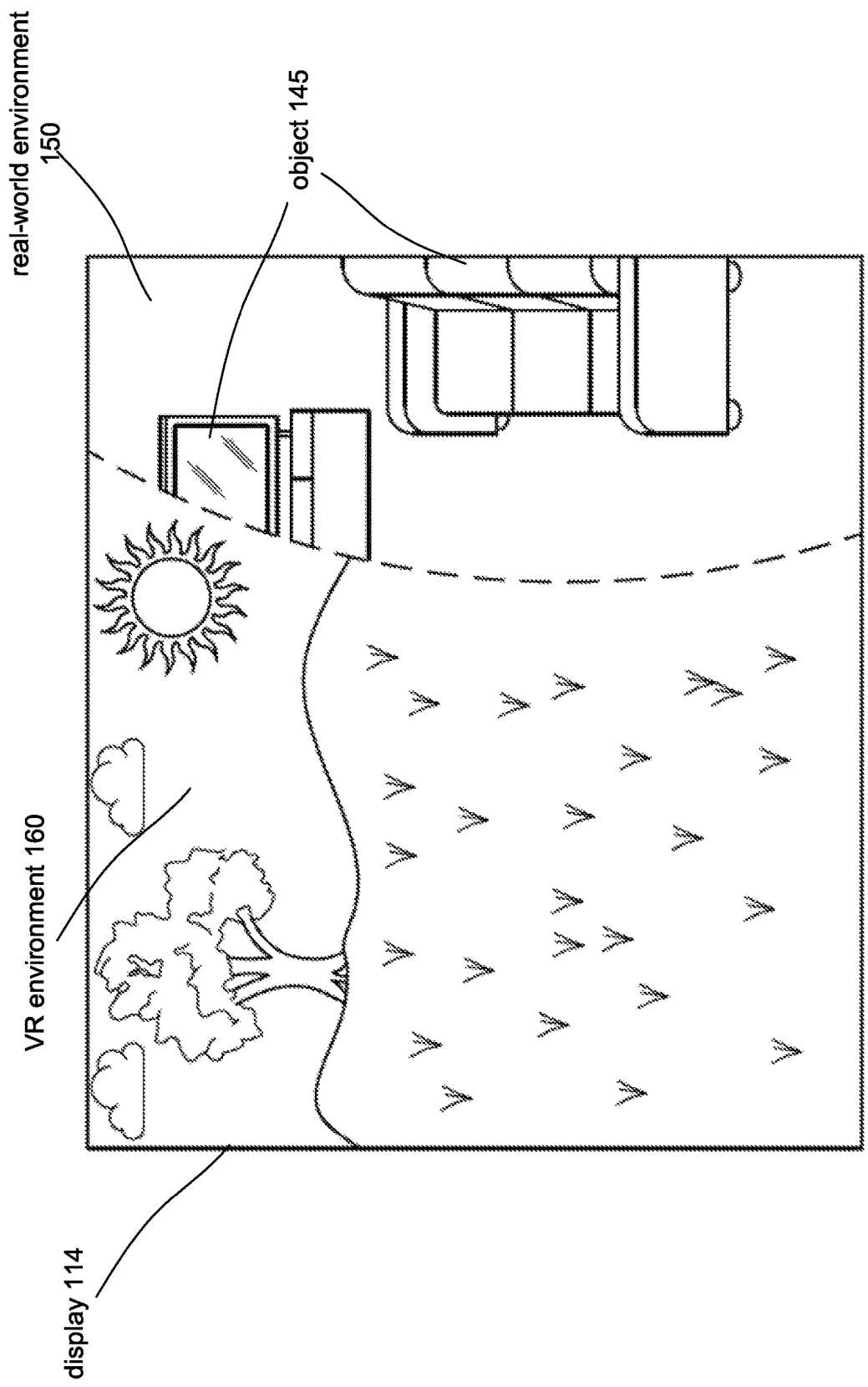
FIG. 9 illustrates an example view of a display of a VR display device.

FIG. 9 illustrates an example view of a display 114 view of a VR display device 135. The display 114 renders a VR environment 160, with a passthrough view of the real-world environment 150 comprising real world objects 145 (e.g., furniture and objects such as a TV and a couch). In particular embodiments, rendering the first output image comprising the proximity warning may further comprise rendering a passthrough view of the shared real-world environment 150. That is, a directional passthrough view may be triggered by the proximity warning to render at least on a portion of the display 114 a view of the real-world environment 150 comprising the one or more objects 145 and users 102. Passthrough views are discussed in U.S. patent application Ser. No. 17/139,434, which is incorporated by reference herein.

Figure 10B:
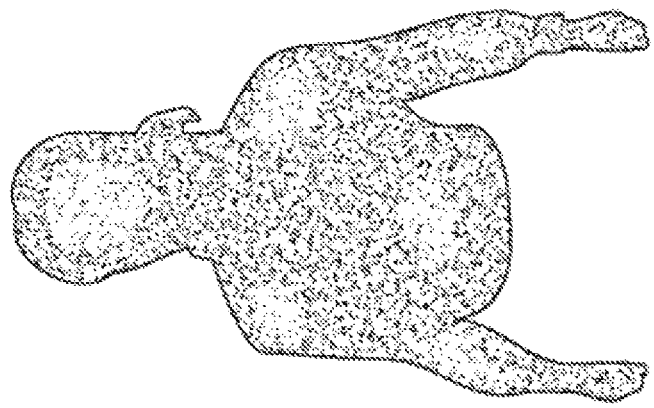
FIG. 10B illustrates an example view of a passthrough view of a user.
Figure 10A:
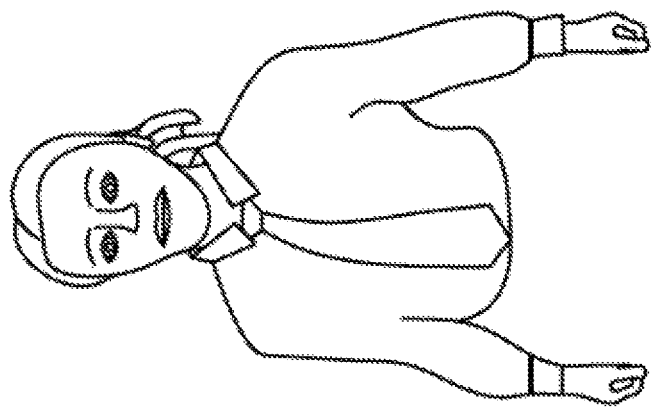
FIG. 10A illustrates an example view of a VR avatar.

FIG. 10A illustrates an example view of a VR avatar 185. While immersed in the VR environment 160, users may be rendered as avatars 185. FIG. 10B illustrates an example view of a passthrough view of a user 102. The passthrough view of the user 102 (e.g., the second user 102*b* wearing the second VR display device 135*b* and holding one or more controllers 106) may be rendered using the localization information comprising a pose of the second VR display device 135*b* and the one or more poses of the one or more hand-held controllers 106 coupled to the second VR display device 135*b*. In particular embodiments, the VR system 100 may interpolate, based on the pose of the second VR display device 135*b* and the one or more poses of the one or more hand-held controllers 106, a body of a user 102*b* of the second VR display device 135*b*. A passthrough view of the "outline" of the another user (e.g., the user 102*b*) may be implemented using, for example, inverse kinematics to determine the position of other body parts, e.g., to interpolate the arms and shoulders between the hands holding the one or more controllers 106 and the head wearing the VR display device 135*b*. Other embodiments may implement image processing software to determine a cutout or outline of the other users, e.g., the user 102*b*. Although this disclosure describes rendering users in the VR environment in a particular manner, this disclosure contemplates rendering users in the VR environment in any suitable manner. A technical advantage of the embodiments may include providing spatial information by providing a first user a quick glimpse of the real-world environment through directional passthrough views of the real-world environment while immersed in the VR environment, or providing outline renderings of one or more other users in the VR environment to alert the first user of the one or more other users that may lie in their path without significantly disrupting the immersion of the VR experience.

Figure 11:
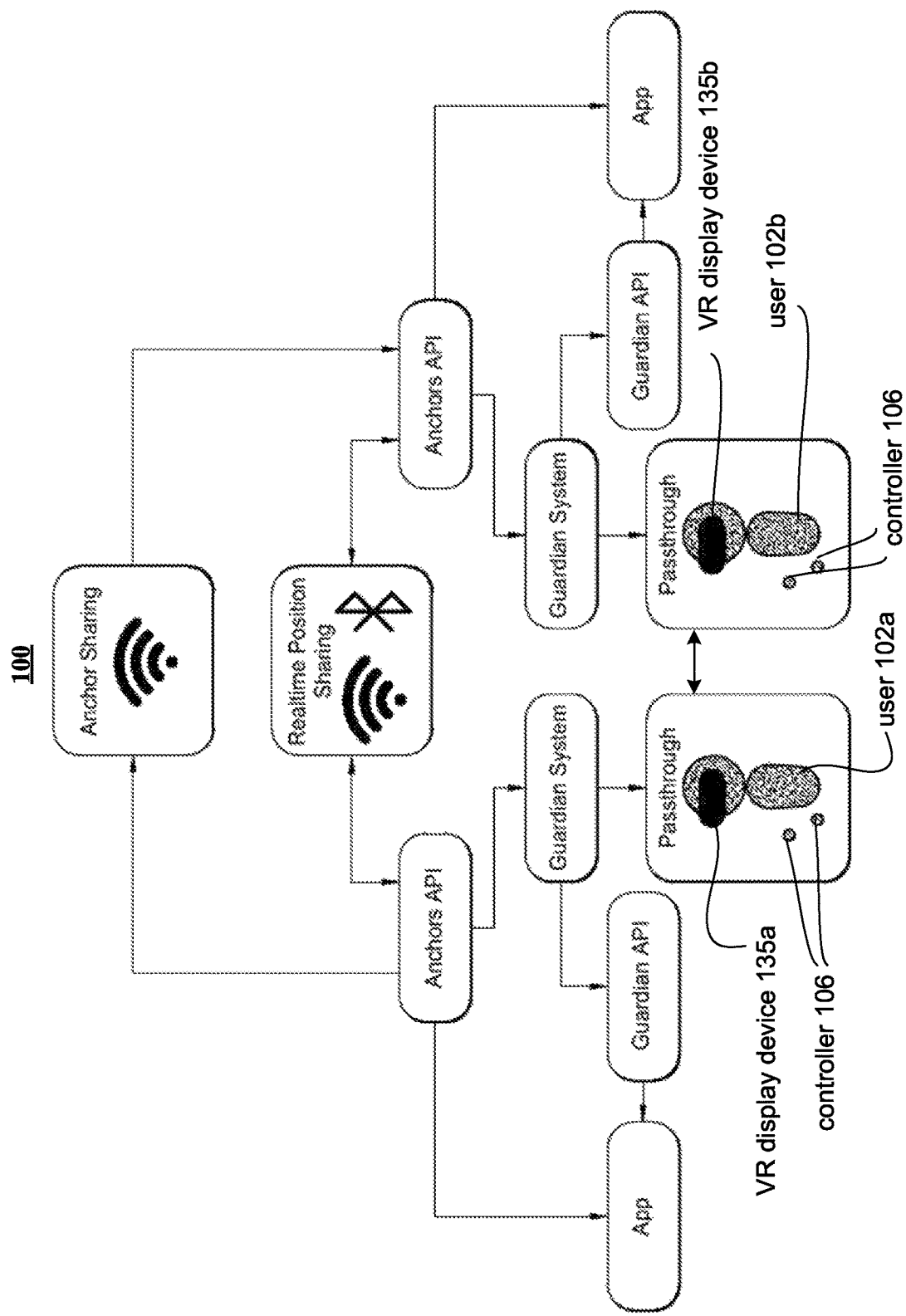
FIG. 11 illustrates a diagrammatic view of an example VR system.

FIG. 11 illustrates a diagrammatic view of an example VR system 100. The two or more VR display devices 135*a*, 135*b* may receive localization information in a number of ways, including via direct peer-to-peer communication between the two or more VR display devices 135*a*, 135*b*. As an example and not by way of limitation, localization information may be communicated directly between the VR display devices 135*a*, 135*b* via Bluetooth. The localization information may be received via a first companion device associated with the first VR device 135*a*, and from a second companion device associated with the second VR device 135*b*. As an example and not by way of limitation, the companion device may be a sensor system coupled to each VR display device 135*a*, 135*b*. The localization information may be received via a backend server system. Each VR display device 135*a* and 135*b* may communicate localization information about each respective VR display device 135*a*, 135*b* to the server system, which may then relay the localization information to the other VR display device 135*a*, 135*b*.

Figure 12:
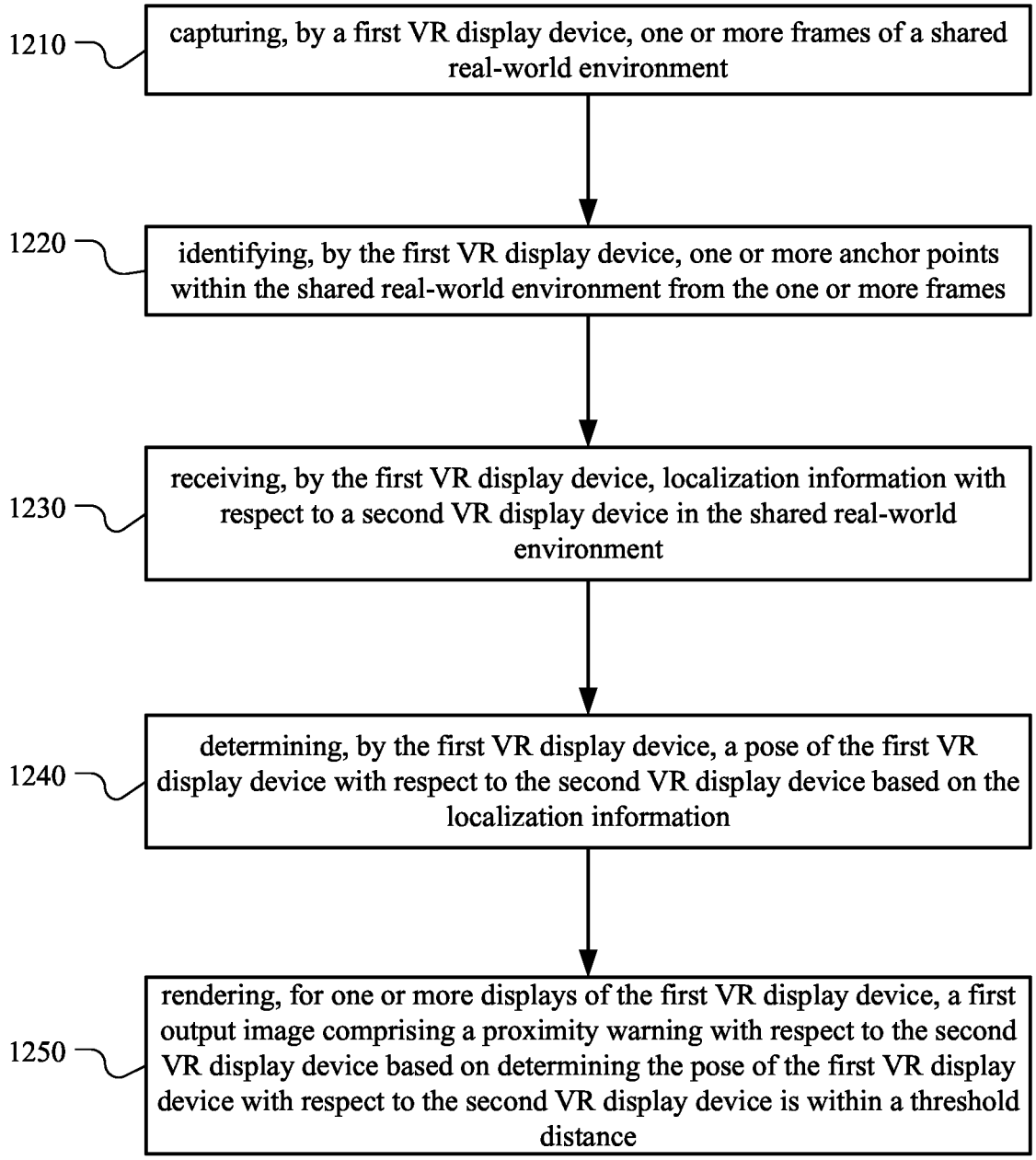
FIG. 12 illustrates an example method for managing spatial awareness in a shared real-world environment with multiple VR headsets.

FIG. 12 illustrates an example method 1200 for managing spatial awareness in a shared real-world environment with multiple VR headsets. The method may begin at step 1210, where one or more computing systems may capture, by a first VR display device, one or more frames of a shared real-world environment. At step 1220, the one or more computing systems may identify, by the first VR display device, one or more anchor points within the shared real-world environment from the one or more frames. At step 1230, the one or more computing systems may receive, by the first VR display device, localization information with respect to a second VR display device in the shared real-world environment. At step 1240, the one or more computing systems may determine, by the first VR display device, a pose of the first VR display device with respect to the second VR display device based on the localization information. At step 1250, the one or more computing systems may render, for one or more displays of the first VR display device, a first output image comprising a proximity warning with respect to the second VR display device based on determining the pose of the first VR display device with respect to the second VR display device is within a threshold distance. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for managing spatial awareness in a shared real-world environment with multiple VR headsets including the particular steps of the method of FIG. 12, this disclosure contemplates any suitable method for managing spatial awareness in a shared real-world environment with multiple VR headsets including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
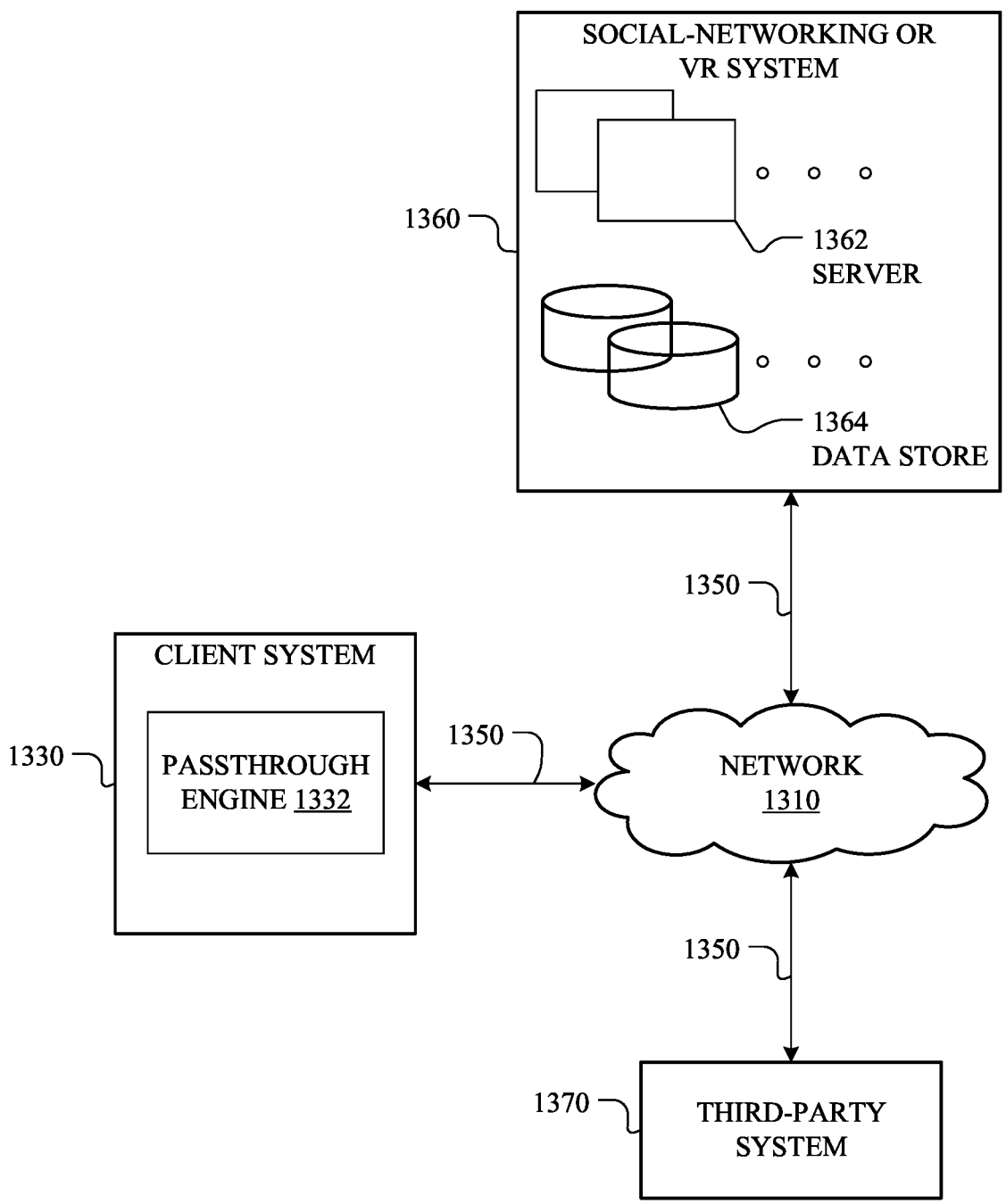
FIG. 13 illustrates an example network environment associated with a social-networking system.

FIG. 13 illustrates an example network environment 1300 associated with a social-networking system. Network environment 1300 includes a client system 1330, a social-networking system 1360, and a third-party system 1370 connected to each other by a network 1310. Although FIG. 13 illustrates a particular arrangement of client system 1330, social-networking system 1360, third-party system 1370, and network 1310, this disclosure contemplates any suitable arrangement of client system 1330, social-networking system 1360, third-party system 1370, and network 1310. As an example and not by way of limitation, two or more of client system 1330, social-networking system 1360, and third-party system 1370 may be connected to each other directly, bypassing network 1310. As another example, two or more of client system 1330, social-networking system 1360, and third-party system 1370 may be physically or logically co-located with each other in whole or in part. Moreover, although FIG. 13 illustrates a particular number of client systems 1330, social-networking systems 1360, third-party systems 1370, and networks 1310, this disclosure contemplates any suitable number of client systems 1330, social-networking systems 1360, third-party systems 1370, and networks 1310. As an example and not by way of limitation, network environment 1300 may include multiple client system 1330, social-networking systems 1360, third-party systems 1370, and networks 1310.

This disclosure contemplates any suitable network 1310. As an example and not by way of limitation, one or more portions of network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1310 may include one or more networks 1310.

Links 1350 may connect client system 1330, social-networking system 1360, and third-party system 1370 to communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout network environment 1300. One or more first links 1350 may differ in one or more respects from one or more second links 1350.

In particular embodiments, client system 1330 may be an electronic device including hardware, software, or embedded logic components or a combination of two or more such components and capable of carrying out the appropriate functionalities implemented or supported by client system 1330. As an example and not by way of limitation, a client system 1330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1330. A client system 1330 may enable a network user at client system 1330 to access network 1310. A client system 1330 may enable its user to communicate with other users at other client systems 1330.

In particular embodiments, client system 1330 may include a web browser 1332, and may have one or more add-ons, plug-ins, or other extensions. A user at client system 1330 may enter a Uniform Resource Locator (URL) or other address directing the web browser 1332 to a particular server (such as server 1362, or a server associated with a third-party system 1370), and the web browser 1332 may generate a Hyper Text Transfer Protocol (HTTP) request and communicate the HTTP request to server. The server may accept the HTTP request and communicate to client system 1330 one or more Hyper Text Markup Language (HTML) files responsive to the HTTP request. Client system 1330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 1360 may be a network-addressable computing system that can host an online social network. Social-networking system 1360 may generate, store, receive, and send social-networking data, such as, for example, user-profile data, concept-profile data, social-graph information, or other suitable data related to the online social network. Social-networking system 1360 may be accessed by the other components of network environment 1300 either directly or via network 1310. As an example and not by way of limitation, client system 1330 may access social-networking system 1360 using a web browser 1332, or a native application associated with social-networking system 1360 (e.g., a mobile social-networking application, a messaging application, another suitable application, or any combination thereof) either directly or via network 1310. In particular embodiments, social-networking system 1360 may include one or more servers 1362. Each server 1362 may be a unitary server or a distributed server spanning multiple computers or multiple datacenters. Servers 1362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1362 may include hardware, software, or embedded logic components or a combination of two or more such components for carrying out the appropriate functionalities implemented or supported by server 1362. In particular embodiments, social-networking system 1360 may include one or more data stores 1364. Data stores 1364 may be used to store various types of information. In particular embodiments, the information stored in data stores 1364 may be organized according to specific data structures. In particular embodiments, each data store 1364 may be a relational, columnar, correlation, or other suitable database. Although this disclosure describes or illustrates particular types of databases, this disclosure contemplates any suitable types of databases. Particular embodiments may provide interfaces that enable a client system 1330, a social-networking system 1360, or a third-party system 1370 to manage, retrieve, modify, add, or delete, the information stored in data store 1364.

In particular embodiments, social-networking system 1360 may store one or more social graphs in one or more data stores 1364. In particular embodiments, a social graph may include multiple nodes—which may include multiple user nodes (each corresponding to a particular user) or multiple concept nodes (each corresponding to a particular concept)—and multiple edges connecting the nodes. Social-networking system 1360 may provide users of the online social network the ability to communicate and interact with other users. In particular embodiments, users may join the online social network via social-networking system 1360 and then add connections (e.g., relationships) to a number of other users of social-networking system 1360 to whom they want to be connected. Herein, the term "friend" may refer to any other user of social-networking system 1360 with whom a user has formed a connection, association, or relationship via social-networking system 1360.

In particular embodiments, social-networking system 1360 may provide users with the ability to take actions on various types of items or objects, supported by social-networking system 1360. As an example and not by way of limitation, the items and objects may include groups or social networks to which users of social-networking system 1360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1360 or by an external system of third-party system 1370, which is separate from social-networking system 1360 and coupled to social-networking system 1360 via a network 1310.

In particular embodiments, social-networking system 1360 may be capable of linking a variety of entities. As an example and not by way of limitation, social-networking system 1360 may enable users to interact with each other as well as receive content from third-party systems 1370 or other entities, or to allow users to interact with these entities through an application programming interfaces (API) or other communication channels.

In particular embodiments, a third-party system 1370 may include one or more types of servers, one or more data stores, one or more interfaces, including but not limited to APIs, one or more web services, one or more content sources, one or more networks, or any other suitable components, e.g., that servers may communicate with. A third-party system 1370 may be operated by a different entity from an entity operating social-networking system 1360. In particular embodiments, however, social-networking system 1360 and third-party systems 1370 may operate in conjunction with each other to provide social-networking services to users of social-networking system 1360 or third-party systems 1370. In this sense, social-networking system 1360 may provide a platform, or backbone, which other systems, such as third-party systems 1370, may use to provide social-networking services and functionality to users across the Internet.

In particular embodiments, a third-party system 1370 may include a third-party content object provider. A third-party content object provider may include one or more sources of content objects, which may be communicated to a client system 1330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1360 also includes user-generated content objects, which may enhance a user's interactions with social-networking system 1360. User-generated content may include anything a user can add, upload, send, or "post" to social-networking system 1360. As an example and not by way of limitation, a user communicates posts to social-networking system 1360 from a client system 1330. Posts may include data such as status updates or other textual data, location information, photos, videos, links, music or other similar data or media. Content may also be added to social-networking system 1360 by a third-party through a "communication channel," such as a newsfeed or stream.

In particular embodiments, social-networking system 1360 may include a variety of servers, sub-systems, programs, modules, logs, and data stores. In particular embodiments, social-networking system 1360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1360 may also include suitable components such as network interfaces, security mechanisms, load balancers, failover servers, management-and-network-operations consoles, other suitable components, or any suitable combination thereof. In particular embodiments, social-networking system 1360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1360 to one or more client systems 1330 or one or more third-party system 1370 via network 1310. The web server may include a mail server or other messaging functionality for receiving and routing messages between social-networking system 1360 and one or more client systems 1330. An API-request server may allow a third-party system 1370 to access information from social-networking system 1360 by calling one or more APIs. An action logger may be used to receive communications from a web server about a user's actions on or off social-networking system 1360. In conjunction with the action log, a third-party-content-object log may be maintained of user exposures to third-party-content objects. A notification controller may provide information regarding content objects to a client system 1330. Information may be pushed to a client system 1330 as notifications, or information may be pulled from client system 1330 responsive to a request received from client system 1330. Authorization servers may be used to enforce one or more privacy settings of the users of social-networking system 1360. A privacy setting of a user determines how particular information associated with a user can be shared. The authorization server may allow users to opt in to or opt out of having their actions logged by social-networking system 1360 or shared with other systems (e.g., third-party system 1370), such as, for example, by setting appropriate privacy settings. Third-party-content-object stores may be used to store content objects received from third parties, such as a third-party system 1370. Location stores may be used for storing location information received from client systems 1330 associated with users. Advertisement-pricing modules may combine social information, the current time, location information, or other suitable information to provide relevant advertisements, in the form of notifications, to a user.

Figure 14:
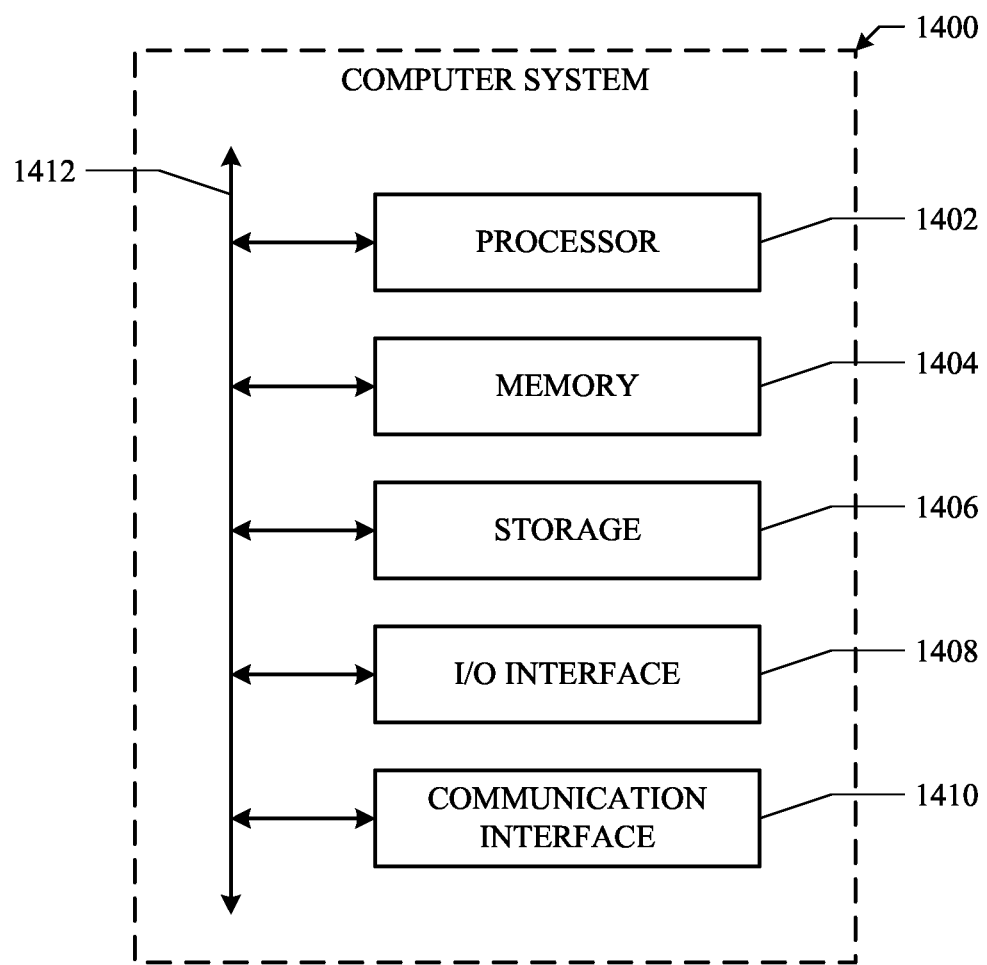
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    capturing, by a first virtual reality (VR) display device, one or more frames of a shared real-world environment, wherein the first VR display device comprises one or more first external-facing cameras with a first field of view of the shared real-world environment, wherein the first VR display device is proximate to a second VR display device in the shared real-world environment, wherein the second VR display device is not in the first field of view;
    identifying, by the first VR display device, one or more anchor points within the shared real-world environment from the one or more frames, wherein each of the one or more of the anchor points is A) relative to one or more real-world features and B) commonly known by both the first VR display device and the second VR display device;
    receiving, by the first VR display device, localization information defining a position of the second VR display device in relation to the first VR display device, in the shared real-world environment, wherein the position is defined in relation to one or more of the anchor points and is not defined in the localization information in relation to C) a position of the first VR display device in the shared real-world environment or D) the first field of view, wherein the second VR display device comprises one or more second external-facing cameras with a second field of view of the shared real-world environment, wherein the first VR display device is not in the second field of view, wherein the second VR display device is not in the first field of view, wherein one or more of the anchor points are in both the first and second field of views;
    determining, by the first VR display device, a pose of the first VR display device with respect to the second VR display device based on the localization information, wherein the first VR display device is not in the second field of view, wherein the second VR display device is not in the first field of view, wherein one or more of the anchor points are in both the first and second field of views; and
    rendering, for one or more displays of the first VR display device, a first output image comprising a proximity warning with respect to the second VR display device based on determining the pose of the first VR display device with respect to the second VR display device is within a threshold distance, wherein the second VR display device is not in the first field of view.

2. The method of claim 1, wherein rendering the first output image comprising the proximity warning further comprises rendering a passthrough view of the shared real-world environment.

3. The method of claim 2, wherein the localization information comprises a pose of the second VR display device and one or more poses of one or more hand-held controllers coupled to the second VR display device, wherein the method further comprises:
    interpolating, based on the pose of the second VR display device and the one or more poses of the one or more hand-held controllers, a body of a user of the second VR display device,
    wherein the passthrough view comprises a cutout view of the body of the user of the second VR display device.

4. The method of claim 1, wherein the proximity warning is rendered further based on determining a relative speed of the first VR display device with respect to the second VR display device is greater than a threshold speed.

5. The method of claim 1, wherein the proximity warning further comprises a haptic alert.

6. The method of claim 1, wherein the proximity warning further comprises an auditory alert.

7. The method of claim 1, wherein the proximity warning comprises a visual alert.

8. The method of claim 1, wherein the one or more anchor points comprise one or more of an object, a boundary, or a feature within the shared real-world environment.

9. The method of claim 1, further comprising:
    determining a direction of approach of the second VR display device relative to the first VR display device;
    wherein the proximity warning comprises an indication of the direction of approach.

10. The method of claim 9, wherein the proximity warning is in a peripheral view of the first VR display device when the direction of approach is determined to be perpendicular to a field of view of the first VR display device.

11. The method of claim 9, wherein the proximity warning is in a peripheral view of and behind the first VR display device when the direction of approach is determined to be away from a field of view of the first VR display device.

12. The method of claim 9, wherein the proximity warning is in a field of view of the first VR display device when the direction of approach is determined to be toward a field of view of the first VR display device.

13. The method of claim 1, wherein the localization information is received via a direct peer-to-peer connection between the first VR device and the second VR device.

14. The method of claim 1, wherein the localization information is received via a first companion device associated with the first VR device and from a second companion device associated with the second VR device.

15. The method of claim 1, wherein the localization information is received via a backend server system.

16. The method of claim 1, further comprising:
determining a first pose of the first VR display device with respect to one or more of the anchor points;
determining a second pose of the second VR display device with respect to one or more of the anchor points;
determining a distance between the first VR display device and the second VR display device based on the first and second poses; and
determining the distance between the first VR display device and the second VR display device is within the threshold distance.

17. A system comprising: one or more processors; and one or more computer-readable non-transitory storage media coupled to one or more of the processors and comprising instructions operable when executed by one or more of the processors to cause the system to:
capture, by a first virtual reality (VR) display device, one or more frames of a shared real-world environment, wherein the first VR display device comprises one or more first external-facing cameras with a first field of view of the shared real-world environment, wherein the first VR display device is proximate to a second VR display device in the shared real-world environment, wherein the second VR display device is not in the first field of view;
identify, by the first VR display device, one or more anchor points within the shared real-world environment from the one or more frames, wherein each of the one or more of the anchor points is A) relative to one or more real-world features and B) commonly known by both the first VR display device and the second VR display device;
receive, by the first VR display device, localization information defining a position of the second VR display device in relation to the first VR display device, in the shared real-world environment, wherein the position is defined in relation to one or more of the anchor points and is not defined in the localization information in relation to C) a position of the first VR display device in the shared real-world environment or D) the first field of view, wherein the second VR display device comprises one or more second external-facing cameras with a second field of view of the shared real-world environment, wherein the first VR display device is not in the first field of view, wherein one or more of the anchor points are in both the first and second field of views;
determine, by the first VR display device, a pose of the first VR display device with respect to the second VR display device based on the localization information, wherein the first VR display device is not in the second field of view, wherein the second VR display device is not in the first field of view, wherein one or more of the anchor points are in both the first and second field of views; and
render, for one or more displays of the first VR display device, a first output image comprising a proximity warning with respect to the second VR display device based on determining the pose of the first VR display device with respect to the second VR display device is within a threshold distance, wherein the second VR display device is not in the first field of view.

18. The system of claim 17, wherein rendering the first output image comprising the proximity warning further comprises rendering a passthrough view of the shared real-world environment.

19. One or more computer-readable non-transitory storage media embodying software that is operable when executed to:
capture, by a first virtual reality (VR) display device, one or more frames of a shared real-world environment, wherein the first VR display device comprises one or more first external-facing cameras with a first field of view of the shared real-world environment, wherein the first VR display device is proximate to a second VR display device in the shared real-world environment, wherein the second VR display device is not in the first field of view;
identify, by the first VR display device, one or more anchor points within the shared real-world environment from the one or more frames, wherein each of the one or more of the anchor points is A) relative to one or more real-world features and B) commonly known by both the first VR display device and the second VR display device;
receive, by the first VR display device, localization information defining a position of the second VR display device in relation to the first VR display device, in the shared real-world environment, wherein the position is defined in relation to one or more of the anchor points and is not defined in the localization information in relation to C) a position of the first VR display device in the shared real-world environment or D) the first field of view, wherein the second VR display device comprises one or more second external-facing cameras with a second field of view of the shared real-world environment, wherein the first VR display device is not in the second field of view, wherein the second VR display device is not in the first field of view, wherein one or more of the anchor points are in both the first and second field of views;
determine, by the first VR display device, a pose of the first VR display device with respect to the second VR display device based on the localization information, wherein the first VR display device is not in the second field of view, wherein the second VR display device is not in the first field of view, wherein one or more of the anchor points are in both the first and second field of views; and
render, for one or more displays of the first VR display device, a first output image comprising a proximity warning with respect to the second VR display device based on determining the pose of the first VR display device with respect to the second VR display device is within a threshold distance, wherein the second VR display device is not in the first field of view.

* * * * *